United States Patent [19]

Linn et al.

[11] 4,036,338
[45] July 19, 1977

[54] SEALED OIL-FILLED CLUTCH

[75] Inventors: Donald F. Linn, Manlius; Frederick C. Schmidt, Syracuse; John P. Yanko, Liverpool, all of N.Y.

[73] Assignee: Lipe-Rollway Corporation, Syracuse, N.Y.

[21] Appl. No.: 632,258

[22] Filed: Nov. 17, 1975

[51] Int. Cl.² .................. F16D 67/02; F16D 13/56
[52] U.S. Cl. ........................... 192/13 R; 192/18 R; 192/70.29; 192/98; 192/113 B
[58] Field of Search ............. 192/13 R, 18 R, 70.12, 192/70.29, 70.3, 113 B, 98

[56] References Cited
U.S. PATENT DOCUMENTS

| | | |
|---|---|---|
| 2,796,964 | 6/1957 | Root ........................ 192/113 B X |
| 3,179,217 | 4/1965 | Root ........................ 192/113 B X |
| 3,203,520 | 8/1965 | Root ........................ 192/13 R |
| 3,540,557 | 11/1970 | Hasselbacher .............. 192/13 R |
| 3,722,643 | 3/1973 | Kempf ...................... 192/13 R |
| 3,833,099 | 9/1974 | Linn et al. ................. 192/13 R |

*Primary Examiner* — Allan D. Herrmann
*Attorney, Agent, or Firm* — Bruns & Jenney

[57] ABSTRACT

A sealed oil-containing clutch having a novel release mechanism. Instead of having the usual externally located bearing, the release mechanism employs a thrust bearing located inside the sealed clutch enclosure. This results in a saving in space and cost, and since the bearing is exposed to the oil, its life expectancy is increased. The clutch also has but a single cover member which serves as both a structural and a sealing member.

8 Claims, 2 Drawing Figures

SEALED OIL-FILLED CLUTCH

BACKGROUND OF THE INVENTION

This invention relates generally to friction clutches, and has particular reference to a novel construction for a sealed oil-containing clutch.

Clutches having sealed enclosures containing oil have been developed heretofore because it has been recognized that the oil greatly reduces wear at the friction faces in the clutch and also reduces operating temperatures. In most of the oil-containing clutches of the prior art the release mechanism employs the usual externally located bearing which may coact with plungers that pass through the sealed clutch enclosure and are arranged to actuate the clutch release levers. This particular construction adds to the space required for the clutch and also its cost.

Most of the previously developed oil-containing clutches include a cover assembly that comprises separate structural and sealing members. This also adds to the complexity and cost of the clutch construction. A sealed oil-filled clutch having such a construction, as well as a release mechanism with an external bearing, is disclosed in U.S. Pat. No. 3,833,099 to D. F. Linn et al and this patent, which is owned by the assignee of the present invention, is the closest prior art known to the applicants.

SUMMARY OF THE INVENTION

The sealed oil-containing clutch to be disclosed herein has a novel release mechanism in which the release levers are engaged and actuated by a thrust bearing located inside the sealed clutch enclosure. Thus results in a saving in space and cost, and the life expectancy of the bearing is increased due to its continual exposure to the oil. The clutch of the invention also employs a single, unitary cover member that serves as both a structural and a sealing member and this simplifies the construction and effects a cost saving.

A problem that has been experience in oil-containing clutches is that the oil rotates with the clutch and tends to prolong the inertial rotation of the friction discs or plates after disengagement of the clutch. This problem has been solved in the past by providing the clutch with an internal or external clutch brake, an internal brake being disclosed in U.S. Pat. No. 3,833,099 cited above. Locating the clutch brake within the clutch housing or enclosure is advantageous because it saves space and reduces wear on the brake itself. In its preferred form, the clutch of the invention includes an internal brake but it should be understood that the brake can be located externally or eliminated altogether in certain applications of the invention without abridging its other desirable features.

DESCRIPTION OF THE PREFERRED EMBODIMENT

Figure 1:
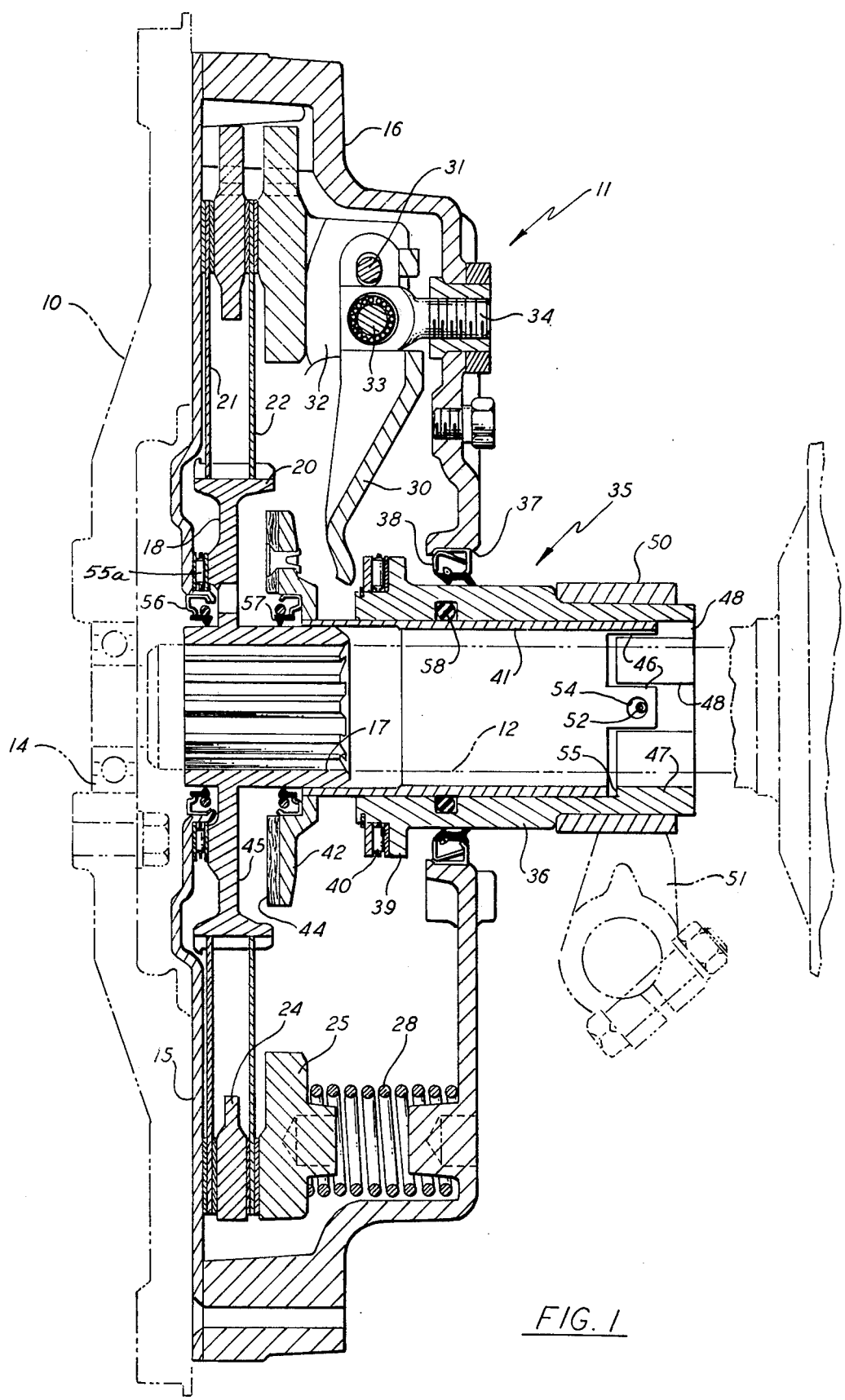
FIG. 1 is a vertical section through the sealed oil-containing clutch of the invention taken substantially on line 1—1 of FIG. 2.

Referring now to the drawings, most of the conventional components of the clutch shown are disclosed in U.S. Pat. No. 2,796,964 to Root and U.S. Pat. No. 3,833,099 cited above. Accordingly, reference may be had to these patents for a more detailed description of the construction and operation of such components.

Briefly, the clutch assembly includes a driving member in the form of a flat-faced flywheel shown in phantom lines at 10, a sealed oil-containing clutch indicated generally at 11 and a driven or output shaft 12 also shown in phantom lines. The shaft is supported at its forward end in conventional manner by a radial bearing 14 carried by the flywheel. The clutch 11 includes a housing or enclosure that is comprised of a plate 15 secured by suitable means to the flywheel and a unitary, dished cover member 16. In accord with the invention, the cover member is constructed so that is serves as both a structural and a sealing member.

Within the clutch enclosure, a hub 17 is mounted on the forward, splined end of the driven shaft 12 for rotation therewith. Hub 17 is formed with an annular flange 18 that is perpendicular to the axis of the hub, and at its circumference the flange has an integral rim 20. A pair of substantially conventional friction discs 21 and 22 are mounted on the rim 20, there being a splined connection between the rim and disc to permit limited axial movement of the latter.

Figure 2:
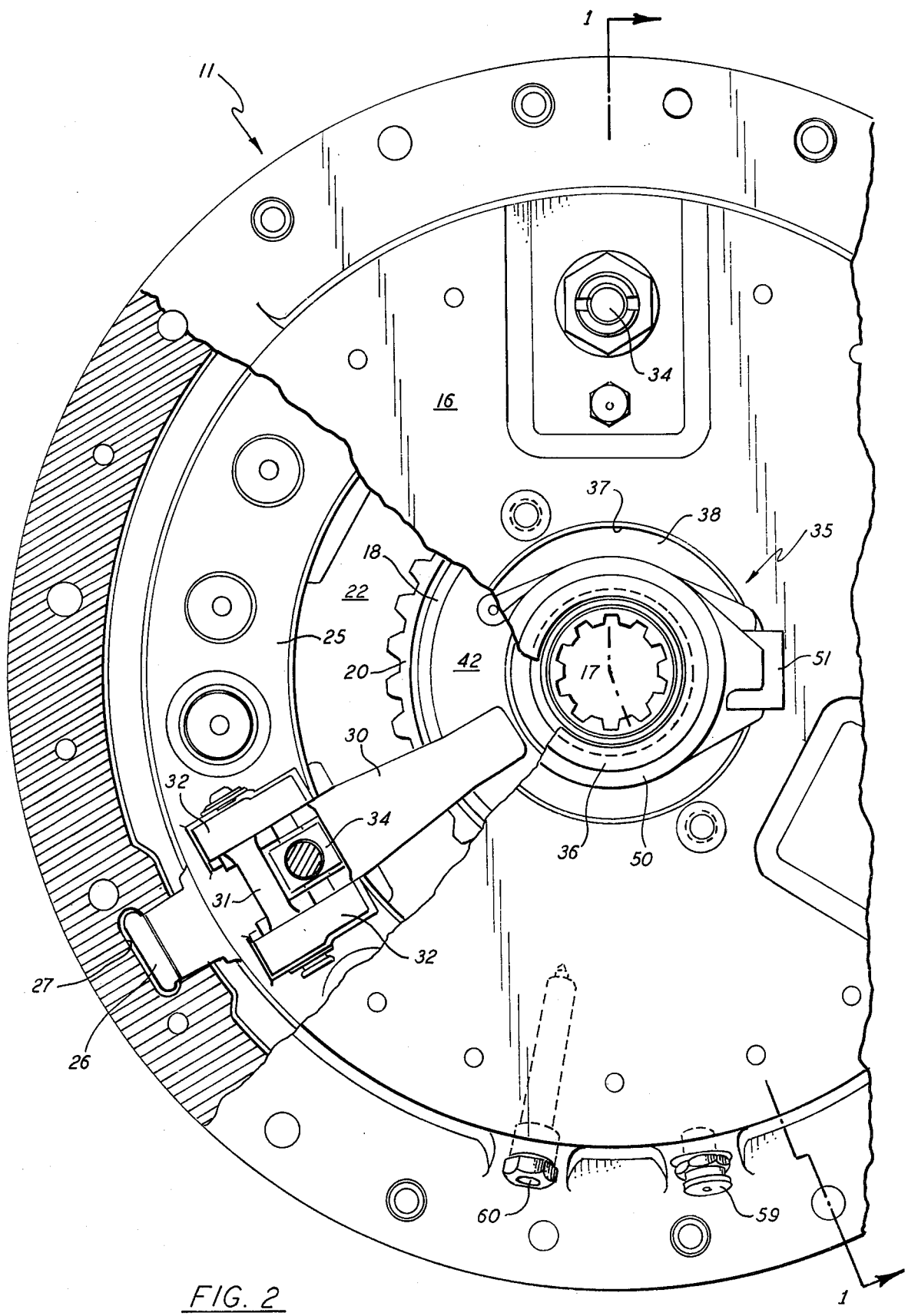
FIG. 2 is a fragmentary right end elevation of the clutch with a portion of the cover broken away to show details of the construction.

Positioned between discs 21 and 22 is an intermediate drive plate 24 and this plate coacts with a pressure plate 25 and the flywheel 10 to drive friction discs and, through the hub 17, the driven shaft. To this end, plate 24 has a plurality of uniformly spaced radially projecting lugs 26, FIG. 2, which are received in corresponding recesses 27 in the thickened side wall of cover member 16 whereby the plate rotates with the flywheel and cover member. When the clutch is engaged, discs 21 and 22 are frictionally engaged by the flywheel engaging plate 15 and intermediate plate 24 and by the plate 24 and pressure plate 25, respectively, the pressure plate being strongly biased toward the flywheel by compression springs 28.

The driving connection between the driving and driven member is disengaged by moving the pressure plate 25 rearwardly (or to the right as viewed in FIG. 1), against the bias of springs 28, by means of release levers 30. The release levers are pivotally connected at 31 to rearwardly projecting lugs 32 on the pressure plate, and are also pivotally connected at 33 to the cover member 16 by conventional eyebolt assemblies 34. With this arrangement, clockwise rotation of the release levers moves the pressure plate 25 rearwardly and disengages the clutch.

The actuation of the release levers to disengage the clutch is effected by a release mechanism generally indicated at 35. The release mechanism shown is for a push type clutch meaning that it must be moved forwardly to disengage the clutch. Release mechanism 35 includes a sleeve 36 that is coaxial with the driven shaft 12 and extends from outside the clutch enclosure into the interior thereof through a central opening 37 in the cover member 16. Positioned between the sleeve and the edge of the opening is an oil-tight seal 38.

At its inner end, sleeve 36 is formed with an integral flange 39 which abuts against one race of a needle type thrust bearing 40. The other race of the bearing is engageable with the inner ends of the release levers 30 for actuation of the latter. The bearing is required because the clutch, including the release levers, is normally rotating whereas the sleeve 36 is held against rotation as will be explained.

In the embodiment of the invention disclosed, the clutch has an internal clutch brake which includes a sleeve 41 that is received with a sliding fit in the release mechanism sleeve 36. At its inner end, the brake sleeve 41 engages a portion of the hub 17 with the sliding fit, and at this end a brake disc 42 is secured to the sleeve as by welding. The disc 42 has a friction facing or surface 44 that moves into engagement with a friction surface 45 on the hub flange 18 when the clutch is disengaged.

At its outer end, the brake sleeve 41 has four outwardly projecting tabs or extensions 46 spaced at 90° intervals, two of the tabs being shown in FIG. 1. Outwardly from the end of sleeve 41, the sleeve 36 has a reduced internal diameter and this reduced diameter portion 47 of the sleeve is slotted out at 48 to receive the outwardly projecting tabs 46. The outer diameter of sleeve 36 is also reduced at its outer end and this portion of the sleeve carries a collar 50 that is operably connected to a conventional clutch yoke 51.

The collar 50 and sleeve 36 are connected together by a pair of diametrically opposite roll pins 52 which are received with a press fit in registering radial bores in the two members. As can be seen in FIG. 1, the inner ends of the roll pins extend into larger diametered holes 54 in two diametrically opposite tabs 46 on the sleeve 41. When the vehicle clutch pedal is depressed it causes the yoke 51 to rock in the counterclockwise direction and moves the collar 50 and sleeve 36 to the left as viewed in FIG. 1. After closing a gap of approximately ⅛ inch between the thrust bearing 40 and the ends of the release levers, the bearing engages the levers and rotates them in the clockwise direction to disengage the clutch.

At about the same time the thrust bearing 40 engages the release levers, an internal shoulder 55 formed by the reduced diameter portion 47 of sleeve 36 moves into contact with the outer end of the brake sleeve 41 and thereafter both sleeves move to the left together causing the friction surface 44 on brake disc 42 to engage the friction surface 45 on the hub flange. Since the brake disc and its sleeve are held against rotation in a manner to be explained, this brakes the rotation of the friction disc and hub which rotation would otherwise continue after disengagement of the clutch due to the inertia of the members and the fact that the oil itself continues to rotate with the driving parts of the clutch. Because the flywheel engaging plate 15 does continue to rotate, a second thrust bearing 55a is positioned between the plate and the hub flange 18 as shown in FIG. 1.

The release mechanism sleeve 36 is held against rotation through its connection with the yoke 51, and the brake sleeve 41 is in turn held against rotation by reason of its tabs 46 being positioned in the slots 48 of sleeve 36. As will be understood, the clutch brake is subjected to high torque in the course of its braking action. When the clutch pedal is released to re-engage the clutch, the yoke returns sleeve 36 to the right as shown in FIG. 1 and brake sleeve 41 is also moved to the right because of the connection between roll pins 52 and the holes 54 in sleeve tabs 46.

In addition to the seal 38 described above, the clutch is provided with oil-tight seals 56 and 57, and an O-ring 58 is positioned between sleeves 36 and 41 as shown. The collar 50 on the outer end of sleeve 36 can be replaced by other collars with slightly different constructions whereby the clutch can be adapted for use in different vehicles by selecting the collar that connects properly with the clutch yoke. As may be seen from FIG. 2, the clutch is provided with a conventional quick disconnect coupling 59 for injecting oil into the clutch, and adjacent to the coupling is a liquid level indicator 60.

From the foregoing description it will be apparent that the invention provides a sealed oil-containing clutch having novel cost saving and space saving features. As will be understood by those familiar with the art, the invention may be embodied in other specific forms without departing from the spirit or essential characteristics thereof.

We claim:

1. A friction clutch for connecting driving and driven shafts comprising an oil-tight enclosure adapted to be secured to the flywheel of an engine for rotation therewith, the enclosure being a two piece assembly having flat flywheel engaging plate and a dished cover member, means within the enclosure for normally effecting a driving connection between the shafts, release levers operable to disengage said driving connection, and means to actuate the release levers including a non-rotatable, axially movable sleeve encircling the driven shaft and extending from outside the oil-tight enclosure into the interior thereof, the actuating means includng at the inner end of the sleeve a thrust bearing engageable with the release levers.

2. A friction clutch as defined in claim 1 together with a second non-rotatable, axially movable sleeve having a friction surface thereon, said means for normally effecting a driving connection between the shafts including a friction disc supporting hub mounted on the drven shaft for rotation therewith, the hub having a friction surface thereon, the fricton surface on the second sleeve being moved into engagement with the hub friction surface by the first-named axially movable sleeve when the release levers are actuated to disengage the driving connection between the shafts.

3. A friction clutch as defined in claim 1 wherein the oil-tight enclosure includes a quick disconnect fitting for injecting oil into the enclosure.

4. A friction clutch for connecting driving and driven shafts comprising an oil-tight enclosure adapted to be secured to the flywheel of an engine for rotation therewith, the enclosure being a two piece assembly having a flat flywheel engaging plate and a dished cover member secured to the plate, the cover member serving as both a structural and a sealing member, a hub mounted on the driven shaft for rotation therewith, a friction disc mounted on the hub for limited axial movement with respect thereto, a pressure plate cooperable with the friction disc and flywheel to drive the driven shaft, a plurality of release levers coactable with the pressure plate to disengage the drive to the driven shaft, and means to actuate the release levers including a non-rotatable, axially movable sleeve encircling the driven shaft and extending from outside the oil-tight enclosure into the interior thereof, the sleeve having at its inner end a thrust bearing engageable with the release levers.

5. A friction clutch as defined in claim 4 wherein the sleeve has adjacent its inner end a flange that abuts against one race of the thrust bearing, the other bearing race being engageable with the release levers.

6. A friction clutch as defined in claim 4 together with a second non-rotatable, axially movable sleeve having a friction surface thereon, said hub having a fricton surface confronting the sleeve friction surface, the friction surface on the second sleeve being moved into engagement with the hub friction surface by the first-named axially movable sleeve when the release levers actuated to disengage the drive to the driven shaft.

7. A friction clutch as defined in claim 6 together with a second thrust bearing positioned between the hub and the flywheel engaging plate of the oil-tight enclosure.

8. A friction clutch as defined in claim 4 wherein the oil-tight enclosure includes a quick disconnect fitting for injecting oil into the enclosure.

* * * * *